United States Patent
Carvajal et al.

(10) Patent No.: US 8,761,329 B2
(45) Date of Patent: Jun. 24, 2014

(54) ROD POSITION DETECTION APPARATUS AND METHOD

(75) Inventors: Jorge V. Carvajal, Irwin, PA (US); Michael A. James, Harmony, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 660 days.

(21) Appl. No.: 13/239,436

(22) Filed: Sep. 22, 2011

(65) Prior Publication Data

US 2013/0077727 A1   Mar. 28, 2013

(51) Int. Cl.
*G21C 17/00* (2006.01)
*G21D 3/00* (2006.01)
*G21C 17/10* (2006.01)
*G21C 17/112* (2006.01)

(52) U.S. Cl.
CPC ............. *G21C 17/112* (2013.01); *G21D 3/001* (2013.01); *G21C 17/102* (2013.01); *Y02E 30/40* (2013.01)
USPC ........................................................ 376/247

(58) Field of Classification Search
USPC ........................................................ 376/247
See application file for complete search history.

(56) References Cited

U.S. PATENT DOCUMENTS

| | | | | |
|---|---|---|---|---|
| 4,714,926 | A * | 12/1987 | Neuner et al. | 340/870.36 |
| 5,333,160 | A | 7/1994 | Runde | |
| 2004/0219892 | A1 | 11/2004 | Vaidyanathan | |
| 2007/0153955 | A1 | 7/2007 | Curbo | |
| 2013/0177123 | A1* | 7/2013 | Sexton et al. | 376/258 |

OTHER PUBLICATIONS

International Preliminary Report on Patentability for PCT/US2012/052446 dated Mar. 25, 2014 (Forms PCT/IB/373, PCT/ISA/237).

* cited by examiner

*Primary Examiner* — Timothy A Brainard
(74) *Attorney, Agent, or Firm* — Joseph C. Spadacene; Westinghouse Electric Company LLC

(57) ABSTRACT

An improved apparatus for determining the position of a drive rod within the interior of a drive rod housing includes a transmission antenna at one location on the housing and a receiving antenna at another location on the housing. An electromagnetic excitation signal sent to the transmission antenna is detected, at least in part, by the receiving antenna, and the received signal is processed with a vector network analyzer routine to model the drive rod housing as a wave guide having a filter response. A group delay is detected and is compared with a calibration data set which provides a current position of the drive rod that corresponds with the group delay.

11 Claims, 3 Drawing Sheets

ROD POSITION DETECTION APPARATUS AND METHOD

BACKGROUND

1. Field

The disclosed and claimed concept relates generally to control circuitry and, more particularly, to an improved apparatus for detecting a position of a rod such as a drive rod that is movable within a passageway such as an interior of a drive rod housing within a nuclear containment.

2. Related Art

Nuclear power plants are generally well known and can be said to include nuclear reactors that may typically be a Pressurized Water Reactors (PWRs) or Boiling Water Reactors (BWRs). Nuclear power plants having a PWR can generally be stated as comprising a reactor that includes one or more fuel cells, a primary loop that cools the reactor, and a secondary loop that drives a steam turbine which operates an electrical generator. Such nuclear power plants typically additionally include a heat exchanger between the primary and secondary loops. The heat exchanger typically is in the form of a steam generator which comprises tubes that carry the primary coolant and a plenum that carries the secondary coolant in heat-exchange relationship with the tubes and thus with the primary coolant. Alternatively, a BWR power plant typically operates at relatively lower pressures and temperatures and employs fuel cells that generate steam which is provided directly to a steam turbine.

The nuclear reaction that occurs within a fuel cell typically is controlled by a number of control rods that are translatable into and out of the fuel cells in a known fashion. The control rods typically are operated by drive rods that are connected directly with the control rods and that are moveably situated within drive rod housings disposed above the fuel cells. Since the control rods control the reaction of the fuel cell, it is desirable to know the precise position of each control rod at all times.

Previous systems for determining the positions of control rods have relied upon a plurality of detectors mounted outside and concentric with a drive rod housing, with the detectors each consisting of a coiled wire slipped over the housing and spaced along its length at regular intervals such as 3.75 inch intervals. As the drive rod moves past the coils, the magnetic flux from the coils changes, and the changing magnetic flux would be processed by signal processing systems.

While such systems have been generally effective for their intended purpose, they have not been without limitation. The various coils have required cable assemblies and AC current to generate the needed electromagnetic field. Also, the accuracy of a detector having coils spaced as mentioned above is only within a range of 3.125 inches. It thus would be desirable to provide a simpler system that provides better accuracy.

SUMMARY

Accordingly, an improved apparatus for determining the position of a rod such as a drive rod within a passageway such as the interior of a drive rod housing includes a transmission antenna at one location on the housing and a receiving antenna at another location on the housing. An electromagnetic excitation signal sent to the transmission antenna is detected, at least in part, by the receiving antenna, and the received signal is processed with a vector network analyzer to model the drive rod housing as a wave guide having a filter response. In particular, a group delay is detected and is compared with a calibration data set which provides a current position of the drive rod that corresponds with the group delay.

Accordingly, an aspect of the disclosed and claimed concept is to provide an improved apparatus for determining a current position of a rod that is moveable within at least a portion of a passageway.

Another aspect of the disclosed and claimed concept is to provide such an apparatus that can be employed on a drive rod that is moveable within a drive rod housing within a nuclear containment.

Another aspect of the disclosed and claimed concept is to provide an improved method for determining a current position of a rod that is moveable within at least a portion of a passageway.

Another aspect of the disclosed and claimed concept is to provide an improved method for developing a set of calibration data that can be employed by an improved apparatus for determining a current position of a rod that is moveable within at least a portion of a passageway.

These and other aspects of the disclosed and claimed concept are provided by an improved method of determining a current position of a rod that is movable within at least a portion of a passageway. The method can be generally stated as including transmitting an electromagnetic signal at a first location along the passageway, detecting as an input at least a portion of the electromagnetic signal at a second location along the passageway, determining a group delay of at least a portion of the input, and employing the group delay in conjunction with a calibration data set in determining a current position of the rod that corresponds with the group delay.

Other aspects of the disclosed and claimed concept are provided by an improved method of generating a calibration data set that can be used for determining a current position of a rod that is movable within at least a portion of a passageway. The method can be generally stated as including transmitting a calibration electromagnetic signal at a first location along the passageway, moving the rod to each of a plurality of positions within the passageway, detecting as a plurality of calibration inputs at least a portion of the electromagnetic signal at a second location along the passageway for each of at least some of the plurality of positions of the rod within the passageway, determining a calibration group delay for each of at least some of the plurality of calibration inputs, and developing a calibration data set based at least in part upon the calibration group delays. The calibration data set is structured to provide a current position of the rod that corresponds with a group delay determined from an input in the form of a detection of at least a portion of an electromagnetic signal at the second location along the passageway when the electromagnetic signal has been transmitted at the first location along the passageway.

Other aspects of the disclosed and claimed concept are provided by an improved apparatus for determining a current position of a rod that is movable within at least a portion of a passageway. The apparatus can be generally stated as including a processor apparatus, an input apparatus, and an output apparatus. The processor apparatus can be generally stated as including a processor and a memory. The input apparatus is in communication with the processor apparatus and can be generally stated as including at least a first transmission antenna structured to be situated at a first location along the passageway and at least a first receiving antenna structured to be situated at a second location along the passageway. The output apparatus is in communication with the processor apparatus. The memory has stored therein a number of routines including a signal analysis routine which, when executed on the processor, cause the apparatus to perform certain operations. The operations can be generally stated as including transmitting an electromagnetic signal from the at least first transmission antenna, detecting as an input at least a portion of the electromagnetic signal from the at least first receiving antenna, subjecting at least a portion of the input to the signal analysis routine to determine a group delay of the input, employing the group delay in conjunction with a calibration data set in determining a current position of the rod that corresponds with the group delay, and outputting the current position with the output apparatus.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
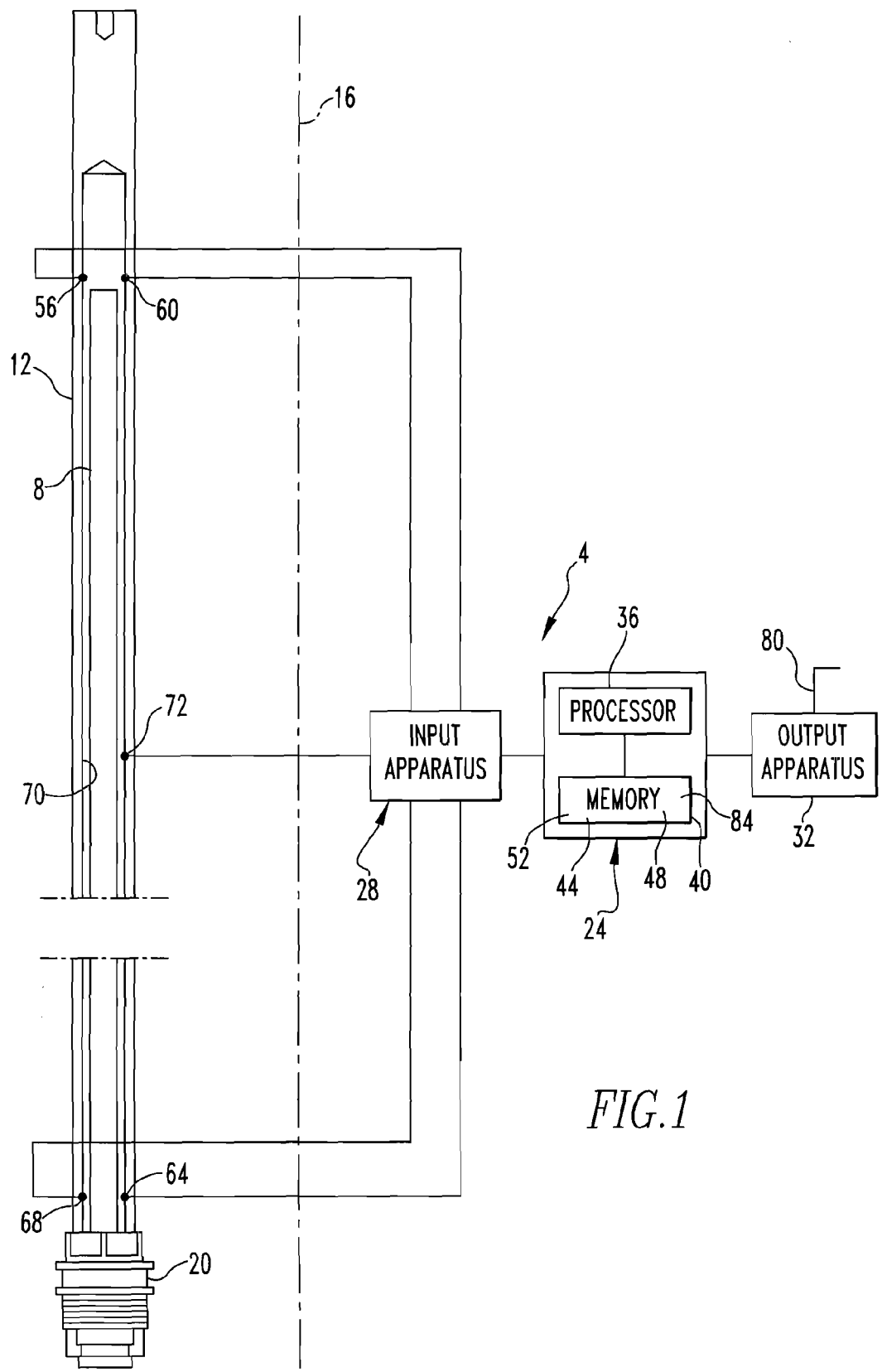
FIG. 1 is a schematic depiction of an improved apparatus in accordance with the disclosed and claimed concept installed on a drive rod housing within a nuclear containment.
Figure 2:
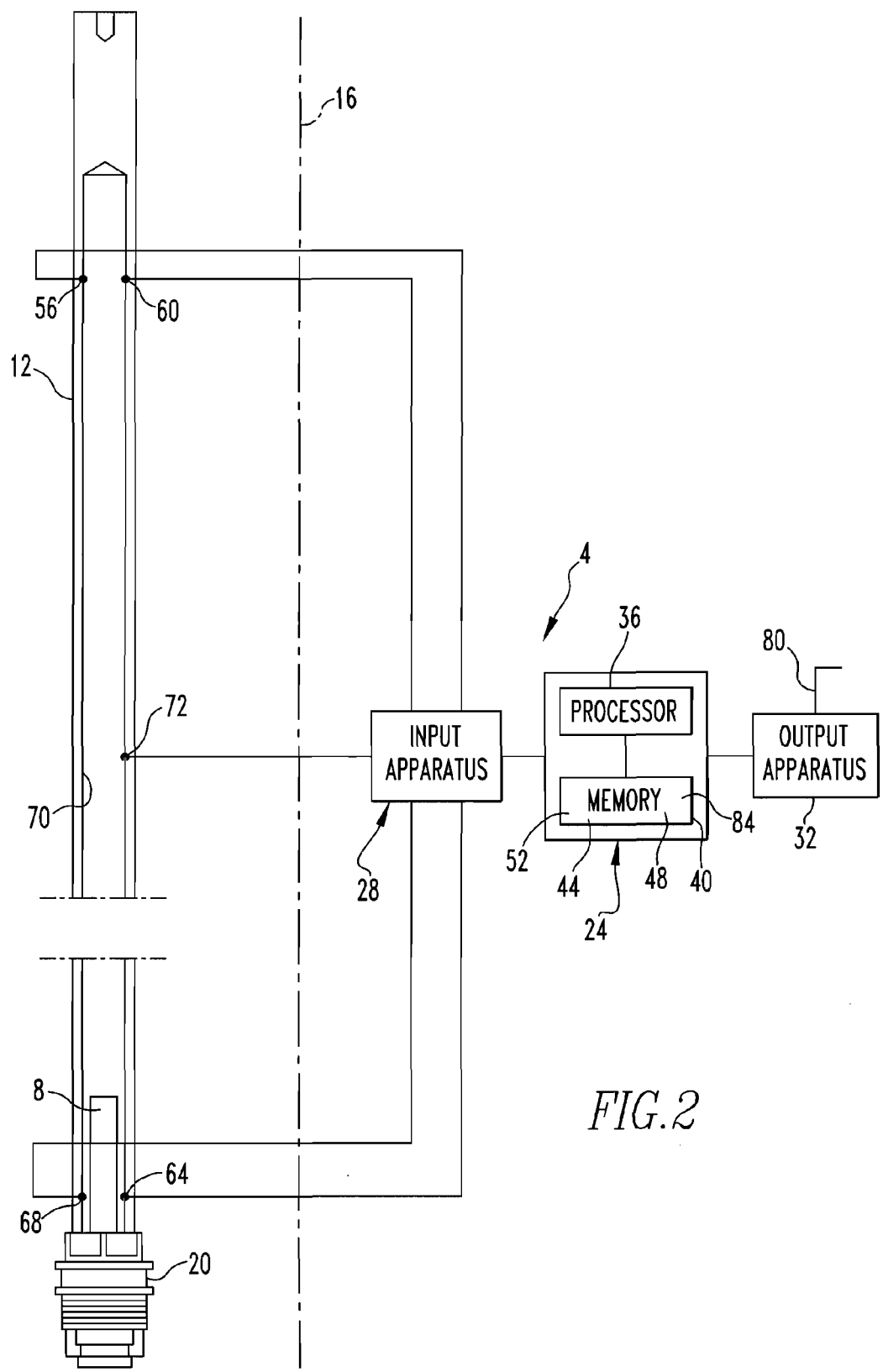
FIG. 2 is a view similar to FIG. 1, except depicting a drive rod at a different position within the drive rod housing.

An improved apparatus 4 for detecting a position of a rod that is moveable within the interior of a passageway is depicted generally in FIGS. 1 and 2. In the exemplary embodiment depicted herein, the apparatus 4 is employed to detect an instantaneous position of a drive rod 8 that is moveable within the cylindrical interior of a drive rod housing 12 that is situated within a schematically represented nuclear containment 16. As is generally understood in the relevant art, the drive rod 8 is axially connected with the end of a control rod (not expressly depicted herein) that is reciprocated into and out of a fuel cell (not expressly depicted herein) within the nuclear containment 16 in order to control the nuclear reaction within the fuel cell. The drive rod housing 12 is depicted herein as including a connector 20 at its lower end that connects with the top of the Control Rod Drive Mechanism (CRDM).

The apparatus 4 is schematically depicted in FIGS. 1 and 2 as comprising a processor apparatus 24, an input apparatus 28, and an output apparatus 32. The input apparatus 28 and the output apparatus 32 are connected with the processor apparatus 24. The processor apparatus 24 includes a processor 36 and a memory 40 that are connected together in a known fashion. The processor 36 can be any of a wide variety of processors such as microprocessors and the like without limitation. The memory 40 can be any of a wide variety of storage devices such as RAM, ROM, EPROM, EEPROM, FLASH, and the like without limitation, and such memory 40 may include an array of removable storage media without departing from the present concept. The memory 40 has stored therein a number of routines that are collectively referred to with the numeral 44 and which include a signal analysis routine 44 that performs functions such as those that are performed by known vector network analyzers. The routines can also include a correction routine 44 that applies a temperature-based correction factor to position results. Other routines 44 that perform other functions are also stored in the memory 44.

The memory 40 further has stored therein a calibration set 48 and a correction data set 52 that are employed by the routines 44 to output an instantaneous, i.e., current, position of the drive rod 8 within the drive rod housing 12 in a fashion that will be set forth in greater detail below. Moreover, the calibration set 48 and the correction data set 52 can be obtained in any of a variety of fashions as will likewise be set forth in greater detail below.

The input apparatus 28 depicted herein includes both a transmission component and a reception component. More particularly, at a first location along the longitudinal extent of the drive rod housing 12, the input apparatus 28 includes a primary transmission antenna 56 and a secondary transmission antenna 60 that are diametrically opposed to one another and that serve as the transmission component. In the exemplary embodiment depicted here, the first location is generally at the bottom of the drive rod housing 12 adjacent the connector 20. At a second location along the longitudinal extent of the drive rod housing 12, the input apparatus 28 further includes a primary receiving antenna 64 and a secondary receiving antenna 68 that are likewise diametrically opposed to one another that serve as the reception component. As can be understood from FIGS. 1 and 2, the exemplary second location is generally at the top of the drive rod housing 12. It is understood, however, that the first and second locations can be different than those expressly depicted herein without departing from the present concept.

While in other embodiments the primary transition and receiving antennas 56 and 64 could be employed without additionally providing the secondary transition and receiving antennas 60 and 68, it is understood that the secondary transmission and receiving antennas 60 and 68 desirably serve as backup antennas in the event that one of the primary antennas may fail. That is, in the environment of a nuclear reactor, the failure of a probe could require a shutdown of a reactor if a backup probe is not also provided. Hence, the secondary transmission and receiving antennas 60 and 68 are provided at the same locations along an interior 70 of the drive rod housing 12 as the corresponding primary antennas, although being situated at positions diametrically opposed from the primary antennas.

The input apparatus 28 further includes a temperature sensor 72. The temperature sensor 72 in the exemplary embodiment depicted herein is a resistive thermal device (RTD), but it may be of other configurations without departing from the present concept.

In accordance with the disclosed and claimed concept, the signal analysis routine 44 generates and transmits from the primary and secondary transmission antennas 56 and 60 an excitation electromagnetic signal that propagates along the interior 70 of the drive rod housing 12 and is received, at least in part, by the primary and secondary receiving antennas 64 and 68. The excitation signal can be any of a wide variety of electromagnetic signals such as an amplitude modulated signal having a variety of frequency components, or any other type of appropriate signal. The interior 70 of the drive rod housing 12 functions as a wave guide for the excitation signal, and an input that is detected by the primary and secondary receiving antennas 64 and 68 is therefore in the nature of a signal that has been subjected to a high pass filter. That is, the signal analysis routine 44 generates the excitation electromagnetic signal for transmission by the primary and secondary transmission antennas 56 and 60, and when the signal is received by the primary and secondary receiving antennas 64 and 68, the detected signal appears to have been subjected to a high pass filter. This is the typical behavior of a wave guide as is generally known in the relevant art.

The drive rod 8 possesses certain dielectric properties, and the coolant water that is disposed within the drive rod housing 12 and which is displaced by the drive rod 8 possesses other dielectric properties. It thus can be understood that the position of the drive rod 8 within the drive rod housing 12 affects the overall dielectric properties that exist between the first location (where the primary and secondary transmission antennas 56 and 60 are disposed) and the second location (where the primary and secondary receiving antennas 64 and 68 are disposed) along the drive rod housing 12. It is known that the dielectric properties of a wave guide can affect a cutoff frequency of the high pass filter behavior of the wave guide, as is indicated in Equation 1:

$$f_c = \frac{X_{mn} c}{2\pi a \sqrt{e_r}} \qquad \text{Equation 1}$$

where $f_c$ is the cutoff frequency;
where $X_{mn}$ is the dominant TE11 mode excited in the wave guide;
where c refers to the speed of light;
where a refers to the radius of the wave guide; and
where $e_r$ refers to the dielectric coefficient.

A group delay that is determined to exist in the signal detected by the primary and secondary receiving antennas 64 and 68 can be correlated to the cutoff frequency $f_c$ (from Equation 1) of a filter of a wave guide according to Equation 2:

$$groupdelay = \frac{length}{c\sqrt{1 - \frac{c^2}{2a - f_c}}} \qquad \text{Equation 2}$$

where groupdelay refers to the group delay of an input signal;
where length is a fixed value;
where c refers to the speed of light;
where a refers to the radius of the wave guide; and
where $f_c$ is the cutoff frequency.

It thus can be seen that an instantaneous, i.e., current, position of the drive rod 8 within the drive rod housing 12, which affects the dielectric coefficient between the first and second locations along the drive rod housing 12, can be correlated to a group delay of a signal that is transmitted from the first location and is received at the second location. As such, the calibration data set 48 provides a correlation between the group delay that is determined to exist in the signal detected at the primary and secondary receiving antennas 64 and 68 and the corresponding current position of the drive rod 8 within the drive rod housing 12.

If the relationship between a given position of the drive rod 8 and the corresponding group delay is desired to be developed empirically, it may be desirable to calculate the particular dielectric coefficients $e_r$ for each of a plurality of positions of the drive rod 8 along the drive rod housing 12 in order to calculate the group delay that corresponds with each such position of the drive rod 8. However, the relationship will likely be more accurately characterized if the calibration data set 48 is derived experimentally, i.e., if the drive rod 8 is disposed in a particular position within the drive rod housing 12, a correlation signal is detected by the primary and secondary receiving antennas 64 and 68, and a corresponding group delay is determined from the signal analysis routine 44. The particular position of the drive rod 8 and the determined corresponding group delay can then be added as a data point to the calibration data set 48 for subsequent retrieval. In this regard, it is noted that the calibration data set 48 can alternatively be in the nature of an algorithm that is developed from such data points and that can calculate rather than retrieve a drive rod position that corresponds with a given detected group delay.

Moreover, when the reactor has been shut down and the drive rod housing 12 is partially filled with air instead of water, the air likewise has dielectric properties that are different from those of the drive rod 8 and the coolant water. It thus may be desirable to likewise develop an alternative calibration data set 84 wherein a relationship is established between the position of the drive rod 8 within the drive rod housing 12 and a corresponding group delay when the drive rod housing 12 is filled to a certain extent with air.

It is also noted that the temperature of the environment within the drive rod housing 12 can affect the group delay that is determined to exist by the signal analysis routine 44. That is, for a given position of the drive rod 8 within the drive rod housing 12, the corresponding group delay can vary depending upon the temperature of the drive rod 8 and the liquid coolant within the interior 70. As such, additional temperature-directed data is stored in the correction data set 52 in order to generate and provide a correction factor which is applied to the current position of the drive rod 8 that is output by the signal analysis routine 44.

That is, the input signal that is detected by the primary and secondary receiving antennas 64 and 68 is input to the signal analysis routine 44 which outputs a corresponding current position of the drive rod 8. Additionally, the temperature sensor 72 provides a temperature input to the correction routine 44, which employs the correction data set 52 to provide a temperature correction factor. The temperature correction factor is applied to the current position of the rod 8 that is output by the signal analysis routine 44 in order to generate a corrected current position of the rod 8. The corrected current position of the rod 8 is then output by the output apparatus 32 on, for instance, an output line 80 that is provided as an input to, for instance, a control system for the nuclear power plant, by way of example.

It is understood that the correction data set 52 could also be in the form of a routine that calculates a correction factor based upon a temperature input rather than merely retrieving a corresponding correction factor from a database, for instance. It is also noted that the correction data set 52 may use more inputs than simply a temperature value from within the interior 70 of the drive rod housing 12 or from the vicinity of the drive rod housing 12. That is, other inputs such as pressure, time within the duty cycle of the fuel cell, the current position of the drive rod 8, and other inputs, by way of example, may be employed in establishing the correction factor that is applied to the current position of the drive rod 8 to determine the corrected current position of the drive rod 8.

Figure 3:
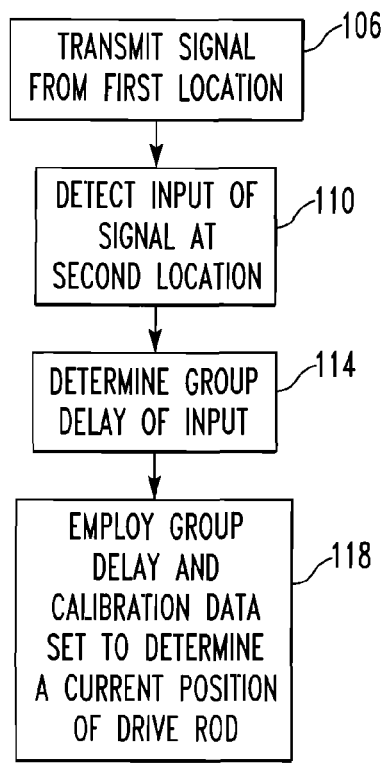
FIG. 3 is a flowchart depicting certain aspects of an improved method in accordance with the disclosed and claimed concept.

FIG. 3 depicts an exemplary flowchart that demonstrates certain aspects of an improved method of determining the position of the drive rod 8 in relation to the drive rod housing 12. Such position can be used to determine a position of a control rod, by way of example, within the nuclear containment 16. Processing begins, as at 106, where an electromagnetic excitation signal is produced from the primary and secondary transmission antennas 56 and 60 that are situated at first location along the interior 70 of the drive rod housing 12. At least a portion of the electromagnetic signal is detected, as at 110, as an input at the primary and secondary receiving antennas 64 and 68. As set forth above, the primary and secondary receiving antennas 64 and 68 are disposed at a second location along the interior 70 of the drive rod housing 12.

A signal analysis routine 44 is then employed, as at 114, to determine a group delay of the input signal that is detected at 110. The group delay is then employed, as at 118, in conjunction with the calibration data set 48 in order to determine a current position of the drive rod 8 within the interior 70 of the drive rod housing 12. In this regard, it is noted that the interior 70 is in the nature of a passageway, and it is reiterated that the passageway functions as a wave guide for the excitation signal that is transmitted, as at 106, from the primary and secondary transmission antennas 56 and 60. The current position of the rod 8 can then be output by the output apparatus 32. As suggested above, a correction factor from the correction data set 52 may be applied to the current position in order to generate and output a corrected current position of the drive rod 8. As further suggested above, either such output can be provided to other control systems within the nuclear power plant and can be used for various purposes.

It is reiterated that the position of the drive rod 8 is desirably known not only during operation of the nuclear power plant, but is also desirably known when the nuclear power plant has been shut down. That is, during operation of the nuclear power plant, the drive rod housing 12 typically will be filled with coolant water except as displaced by the drive rod 8 that is movably received within the interior 70 of the drive rod housing 12. However, when the nuclear power plant has been shut down, the interior 70 of the drive rod housing 12 may be partially or completely emptied of coolant water, with the drive rod 8 thus being at least partially surrounded by air or other gases. It thus would be desirable to have an alternative calibration data set 84 stored in the memory 40 that provides a correlation between group delay and position of the drive rod 8 when some or all of the coolant water has been removed from the interior 70 of the drive rod housing 12. In this regard, it likely will be necessary to derive or experimentally develop an entirely new calibration data set or algorithm since the dielectric properties of air are significantly different than those of the coolant water of a nuclear reactor.

Figure 4:
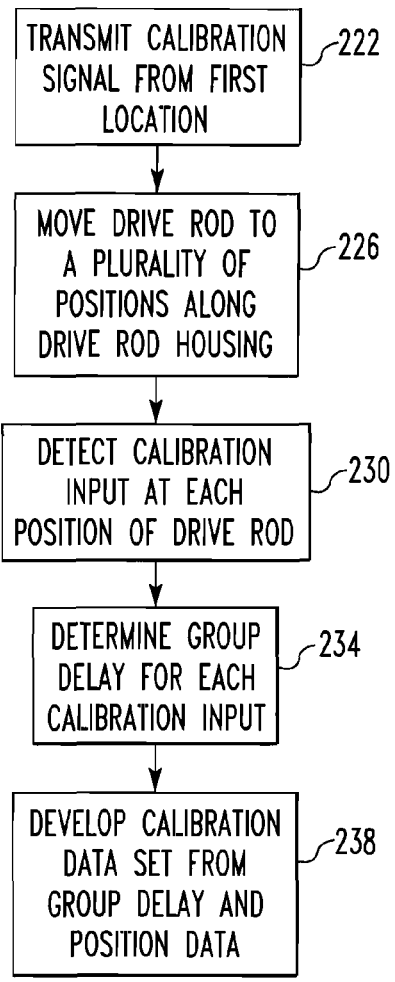
FIG. 4 is another flowchart depicting certain aspects of another improved method in accordance with the disclosed and claimed concept.

Regarding the development of the calibration data set 48 and the alternative calibration data set 84, FIG. 4 depicts a flowchart which generally shows certain aspects of improved method of experimentally developing the calibration data set 48. A similar methodology can be employed to develop the alternative calibration data set 84.

Processing begins, as at 222, where a calibration electromagnetic excitation signal is transmitted from the primary and secondary transmission antennas 56 and 60. The calibration electromagnetic signal may be (and likely will be) the same as the excitation signal that is generated by the signal analysis routine 44. The drive rod 8 is then moved among each of a plurality of positions within the interior 70 of the drive rod housing 12, as at 226. For each such position of the drive rod 8, a calibration input is detected from the primary and secondary receiving antennas 64 and 68, as at 230. A calibration group delay is then calculated for each such calibration input, as at 234. The various calibration group delays are then employed, as at 238, in conjunction with the various positions of the drive rod 8 to develop the calibration data set 48, which is based upon the calibration group delays. As mentioned above, the calibration data set 48 can be either in the form of a routine 44 or in the form of a table such as a database, by way of example. It is reiterated that the aforementioned procedure may desirably be repeated for an alternative environment in which the reactor has been shut down and the interior 70 of the drive rod housing 12 is at least partially filled with air or other gases to develop the alternative calibration data set 84.

Figure 5:
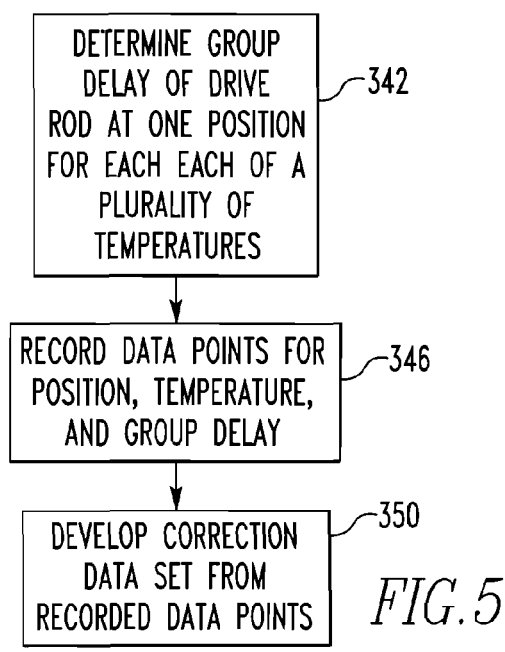
FIG. 5 is a further flowchart depicting other aspects of the improved method.

FIG. 5 depicts certain aspects of the development of the correction data set 52 that are employed to provide a thermal correction factor that can be applied to the current position of the drive rod 8 that results solely from the calibration data set 48. Processing begins, as at 342, where the group delay is determined for a given position of the drive rod 8 at each of a plurality of temperatures within the interior 70 of the drive rod housing 12. While the temperature sensor 72 is depicted as being in direct communication with the interior 70, it is understood that an alternative embodiments the temperature sensor 72 may be otherwise positioned so that it detects the temperature in the vicinity of the drive rod housing 12. In this regard, any such temperature may be employed in developing the correction factor as long as the temperature can thereafter be detected during operation of the nuclear reactor in order to determine what the proper correction factor should be.

In the flowchart of FIG. 5, the variation in temperature indicated at 342 is suggested to occur across a plurality of temperatures for the same position of the drive rod 8. In this regard, it is understood that since that the temperature of the reactor is likely to be more difficult to change than the position of the drive rod 8, the more likely scenario for the actual taking of data would be to cause the temperature in at least the vicinity of the drive rod housing 12 to change to a different temperature and then to move the drive rod 8 to each a plurality of positions and to determine the resultant group delay and record the corresponding temperature. Moreover, it is likely that a group delay need not necessarily be recorded for each incremental position of the drive rod 8 along the drive rod housing 12 at each different temperature. Rather, it may be sufficient to merely perform a limited number of determinations of group delay at a limited number of positions of the drive rod 8 along the drive rod housing 12 for a given temperature in order to gain an understanding of the relationship between temperature and group delay. That is, it is possible that the temperature correction factor may be based upon relatively simple data and/or algorithms that do not require the detailed measurement that is required in developing the calibration data set 48, although the potential for this will be apparent from the results of the experimental process.

Processing continues, as at 346, where the various experimental data such as the change in group delay and the corresponding change in temperature are recorded. The data recorded at 346 can then be used to develop and store, as at 350, the correction data set 52 which, as set forth above, can be in the nature of an algorithm or can be in the nature of a data set stored in a table or database.

The improved method and apparatus 4 thus advantageously enable the determination of a current position of the drive rod 8 within the drive rod housing 12, which can be used to determine the current position of a control rod within a fuel assembly of a nuclear power plant. The resulting apparatus 4 is less expensive to build and maintain and has greater accuracy than previously known systems. Further advantageously, the greater rod position accuracy that is afforded by the improved apparatus 4 can improve the efficiency of a reactor by reducing safety margins. Other advantages will be apparent to those of ordinary skill in the art.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of determining a current position of a rod that is movable within at least a portion of a passageway, the method comprising:
   transmitting an electromagnetic signal at a first location along the passageway;
   detecting as an input at least a portion of the electromagnetic signal at a second location along the passageway;
   determining a group delay of at least a portion of the input; and
   employing the group delay in conjunction with a calibration data set in determining a current position of the rod that corresponds with the group delay.

2. The method of claim 1, further comprising:
   detecting a temperature in at least the vicinity of the passageway;
   employing the temperature in conjunction with a correction data set to determine a temperature correction factor; and
   applying the temperature correction factor to the current position of the rod to obtain a corrected current position of the rod.

3. The method of claim 1 wherein the employing of the group delay in conjunction with the calibration data set comprises inputting the group delay into a calibration routine and outputting from the calibration routine as the current position a position that corresponds with the group delay.

4. The method of claim 1, further comprising:
   employing as the rod a drive rod within a nuclear containment; and
   employing as the passageway a drive rod housing within the nuclear containment.

5. A method of generating a calibration data set that can be used for determining a current position of a rod that is movable within at least a portion of a passageway, the method comprising:
   transmitting a calibration electromagnetic signal at a first location along the passageway;
   moving the rod to each of a plurality of positions within the passageway;
   detecting as a plurality of calibration inputs at least a portion of the electromagnetic signal at a second location along the passageway for each of at least some of the plurality of positions of the rod within the passageway;
   determining a calibration group delay for each of at least some of the plurality of calibration inputs; and
   developing a calibration data set based at least in part upon the calibration group delays, the calibration data set being structured to provide a current position of the rod that corresponds with a group delay determined from an input in the form of a detection of at least a portion of an electromagnetic signal at the second location along the passageway when the electromagnetic signal has been transmitted at the first location along the passageway.

6. The method of claim 5, further comprising:
   developing as the calibration data set a first calibration data set based upon the rod being submerged in water; and
   developing a second calibration data set based upon the rod being at least partially surrounded by air.

7. The method of claim 5, further comprising:
   developing the calibration data set based at least in part upon the rod being at a first position and the environment in at least the vicinity of passageway being at a first temperature;
   developing a correction data set based at least in part upon the rod being at the first position and the environment in at least the vicinity of passageway being at a second temperature different from the first temperature, the correction data set being structured to provide a temperature correction factor for the current position of the rod that corresponds with a temperature detected in at least the vicinity of the passageway.

8. An apparatus for determining a current position of a rod that is movable within at least a portion of a passageway, the apparatus comprising:
   a processor apparatus comprising a processor and a memory;
   an input apparatus in communication with the processor apparatus and comprising at least a first transmission antenna structured to be situated at a first location along the passageway and at least a first receiving antenna structured to be situated at a second location along the passageway;
   an output apparatus in communication with the processor apparatus;
   the memory having stored therein a number of routines including a signal analysis routine which, when executed on the processor, cause the apparatus to perform operations comprising:
   transmitting an electromagnetic signal from the at least first transmission antenna;
   detecting as an input at least a portion of the electromagnetic signal from the at least first receiving antenna;
   subjecting at least a portion of the input to the signal analysis routine to determine a group delay of the input;
   employing the group delay in conjunction with a calibration data set in determining a current position of the rod that corresponds with the group delay; and
   outputting the current position with the output apparatus.

9. The apparatus of claim 8 wherein the operations further comprise:
   detecting a temperature in at least the vicinity of the passageway;
   employing the temperature in conjunction with a correction data set to determine a temperature correction factor; and
   applying the temperature correction factor to the current position of the rod to obtain a corrected current position of the rod.

10. The apparatus of claim 8 wherein the employing of the group delay in conjunction with the calibration data set comprises inputting the group delay into a calibration routine and outputting from the calibration routine as the current position a position that corresponds with the group delay.

11. The apparatus of claim 8 wherein the operations further comprise:
   employing as the rod a drive rod within a nuclear containment; and
   employing as the passageway a drive rod housing within the nuclear containment.

* * * * *